United States Patent
Das et al.

(10) Patent No.: US 7,873,689 B2
(45) Date of Patent: Jan. 18, 2011

(54) DISTRIBUTED SET-EXPRESSION CARDINALITY ESTIMATION

(75) Inventors: Abhinandan Sujit Das, Ithaca, NY (US); Sumit Ganguly, Bhopal (IN); Minos N. Garofalakis, Morristown, NJ (US); Rajeev Rastogi, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1456 days.

(21) Appl. No.: 11/026,499

(22) Filed: Dec. 30, 2004

(65) Prior Publication Data

US 2006/0149744 A1    Jul. 6, 2006

(51) Int. Cl.
G06F 15/16    (2006.01)
(52) U.S. Cl. ..................................................... 709/200
(58) Field of Classification Search .................. 709/200
See application file for complete search history.

(56) References Cited

U.S. PATENT DOCUMENTS

| | | | | |
|---|---|---|---|---|
| 5,926,816 | A * | 7/1999 | Bauer et al. ..................... | 707/8 |
| 6,188,695 | B1 * | 2/2001 | Przybysz ..................... | 370/410 |
| 6,449,618 | B1 * | 9/2002 | Blott et al. ..................... | 707/101 |
| 6,460,010 | B1 * | 10/2002 | Hanes et al. ................. | 702/179 |
| 6,738,789 | B2 * | 5/2004 | Multer et al. ................. | 707/201 |
| 6,757,696 | B2 * | 6/2004 | Multer et al. ................. | 707/201 |
| 6,820,034 | B2 * | 11/2004 | Hanes et al. ................. | 702/179 |
| 6,826,523 | B1 * | 11/2004 | Guy et al. ...................... | 703/22 |
| 7,299,219 | B2 * | 11/2007 | Green et al. .................... | 707/2 |
| 7,305,483 | B2 * | 12/2007 | Yao et al. ..................... | 709/231 |
| 7,395,075 | B2 * | 7/2008 | Posner et al. ............ | 455/456.1 |
| 7,401,002 | B2 * | 7/2008 | Hanes et al. ................. | 702/179 |
| 2002/0055972 | A1 * | 5/2002 | Weinman, Jr. .............. | 709/203 |
| 2006/0085592 | A1 * | 4/2006 | Ganguly et al. ............. | 711/114 |
| 2008/0163189 | A1 * | 7/2008 | Chen et al. ................... | 717/168 |

OTHER PUBLICATIONS

U.S. Appl. No. 10/957,185, filed Sep. 30, 2004, Ganguly et al.
"NetFlow Services and Applications". Cisco Systems White Paper (http://www.cisco.com), 1999.
B. Babcock and C. Olston. "Distributed Top-K Monitoring". In *SIGMOD*, 2003.
M. Charikar, K. Chen, and M. Farach-Colton. "Finding Frequent Items in Data Streams". In ICALP, 2002.
C. Cranor, T. Johnson, O. Spatscheck, and V. Shkapenyuk. "Gigascope: A Stream Database for Network Applications". In *SIGMOD*, 2003.
A. Das, S. Ganguly, M. Garofalakis, and R. Rastogi. "Distributed Set-Expression Cardinality Estimation". Bell Labs Tech. Memorandum, 2003.

(Continued)

*Primary Examiner*—William C Vaughn, Jr.
*Assistant Examiner*—Thomas Richardson
(74) *Attorney, Agent, or Firm*—Wall & Tong, LLP

(57) ABSTRACT

A method and system for answering set-expression cardinality queries while lowering data communication costs by utilizing a coordinator site to provide global knowledge of the distribution of certain frequently occurring stream elements to significantly reduce the transmission of element state information to the central site and, optionally, capturing the semantics of the input set expression in a Boolean logic formula and using models of the formula to determine whether an element state change at a remote site can affect the set expression result.

19 Claims, 7 Drawing Sheets

Distribute Stream Processing Model

OTHER PUBLICATIONS

S. Ganguly, M. Garofalakis, and R. Rastogi. "Processing Set Expressions over Continuous Update Streams". In *SIGMOD*, 2003.

P.B. Gibbons. "Distinct Sampling for Highly-Accurate Answers to Distinct Values Queries and Event Reports". In *VLDB*, 2001.

P.B. Gibbons and S. Tirthapura. "Distributed Streams Algorithms for Sliding Windows". In *SPAA*, 2002.

A. C. Gilbert, Y. Kotidis, S. Muthukrishan, and M.J. Strauss. "How to Summarize the Universe: Dynamic Maintenance of Quantiles". In *VLDB*, 2002.

S. Madden, M. J. Franklin, J. H. Hellerstein, and W. Hong. "The Design of an Acquisitional Query Processor for Sensor Networks". In *SIGMOD*, 2003.

D. Moore, G.M. Voelker, and S. Savage. "Inferring Internet Denial-of-Service Activity". In *USENIX Security Symposium*, 2001.

C. Olston, J. Jiang, and J. Widom. "Adaptive Filters for Continuous Queries over Distributed Data Streams". In *SIGMOD*, 2003.

G. Pottie and W. Kaiser. "Wireless Integrated Network Sensors". Communications of the ACM, 43(5), 2000.

\* cited by examiner

Procedure coordinator $(i, \Delta_i^+, \Delta_i^-)$

Input: Newly inserted ($\Delta_i^+$) and deleted ($\Delta_i^-$) elements for some substream $S_{ij}$.
begin
1. for each element $e \in \Delta_i^-$ do {
2.    $C_i(e) := C_i(e) - 1$;
3.    if $((C_i(e) = 0)$ then $\hat{S}_i := \hat{S} - \{e\}$;
4.    if $(e \in F_i$ and $C_i(e) < \tau )$ {
5.       $F_i := F_i - \{e\}$;
6.       Send "make infrequent" control msgs for $e$ to all remote sites;
7.    }
8.    else if $(e \in F_i$ and $C_i(e) < \theta_i(e))${
9.       $\theta_i(e) := \theta_i(e)/2$;
10.       Send "adjust threshold" control msgs with new threshold
11.       $\theta_i(e)$ for $e$ to all remote sites;
12.    }
13. }
14. for each element $e \in \Delta_i^+$ do {
15.    $C_i(e) := +C_i(e) + 1$;
16.    if $(C_i(e) = 1)$ then $\hat{S}_i := \hat{S} \cup \{e\}$;
17.    if $(e \notin F_i$ and $C_i(e) \geq 2\tau)${
18.       $F_i := F_i \cup \{e\}$;
19.       $\theta_i(e) := \tau$;
20.       Send "make frequent" control msgs for $e$ to all remote sites;
21.    }
22.    else if $(e \in F_i$ and $C_i(e) \geq 4\theta_i(e))${
23.       $\theta_i(e) = 2\theta_i(e)$;
24.       Send "adjust threshold" control msges with new threshold
25.       $\theta_i(e)$ for $e$ to all remote sites;
26.    }
27. }
end Coordinator Actions for Processing Remote Deltas

FIG. 2

Procedure REMOTE($i,e,j$)
Input: Update stream $S_i$, element $e$ and site $j$.
begin 1. $old^+ := \phi_j^+(e);$
2. $old^- := \phi_j^-(e);$
3. $[\phi_j^+(e), \phi_j^-(e)] := \text{COMPUTECHARGE}(e,j,E);$
4. $\Phi_j^+ := \Phi_j^+ + (\phi_j^+(e) - old^+);$
5. $\Phi_j^- := \Phi_j^- + (\phi_j^-(e) - old^-);$
6.   if $(\Phi_j^+ > \epsilon_j \vee \Phi_j^- > \epsilon_j)\{$
7.       for $l := 1$ to $n$ do {
8.            $\Delta_l^+ := S_{l,j} - \hat{S}_{l,j};$
9.            $\Delta_l^- := \hat{S}_{l,j} - S_{l,j};$
10.           $\hat{S}_{l,j} := S_{l,j};$
11.      }
12.    Send "update state" message with triples $<l, \Delta_l^+, \Delta_l^->$
13.    for all substreams $S_{l,j}$ to the coordinator;
14.    for each element $e, \phi_j^+(e) := \phi_j^-(e) := 0;$
15.    $\Phi_j^+ := \Phi_j^- := 0;$
16.   }
end Procedure    COMPUTECHARGE($e,j,E = S_i$)
Input: Element $e$ for whom to compute charge at site $j$,
       expression $E$.
Output: Charges $\phi_j^+(e)$ and $\phi_j^-(e)$.
begin 1.   $\phi^+ := \phi^- := 0;$
2.   if $(e \notin F_i)\{$
3.      if $(e \in (S_{i,j} - \hat{S}_{i,j}))$ then $\phi^+ := 1;$
4.      else if $(e \in (\hat{S}_{i,j} - S_{i,j}))$ then $\phi^- := 1;$
5.   }
6.   else /* $e \in F_i$ */
7.      if $(e \in (\hat{S}_{i,j} - S_{i,j}))$ then $\phi^- := 1/\theta_i(e);$
8.   return $[\phi^+, \phi^-];$
end Remote Site Actions for Computing Charges

FIG. 3

Procedure COMPUTECHARGE2$(e,j,E)$
Input: Element $e$ for whom to compute charge at site $j$; expression $E$
Output: Charges $\phi_j^+(e)$ and $\phi_j^-(e)$.
begin
1.      $\phi^+ := \max\{\text{CHARGE}(e,j,M) : \text{Model } M \text{ satisfies } \psi_j^+\}$;
2.      $\phi^- := \max\{\text{CHARGE}(e,j,M) : \text{Model } M \text{ satisfies } \psi_j^-\}$;
3.      return $[\phi^+, \phi^-]$;
end Procedure CHARGE$(e,j,M)$
Input: Element $e$, site $j$, and model $M$.
Output: Charge $\phi_j(M)$ for model $M$.
Begin
1.      Let $P$ be the set of streams $S_i$ such that either $$\{p_i, \hat{p}_i\} \cap M = \{p_i\} \text{ or } \{p_i \, \hat{p}_i\} \cap M = \{\hat{p}_i\};$$

/*$P$ is the set of streams that have a global state change in M*/

2.      Let $S_i \in P$ be the culprit stream with the smallest charge, index pair $<\phi(S_i), i>$;
     /* $\phi(S_i) = 1/\theta_i(e)$ if $e \in F_i$ and $\phi(S_i) = 1$ otherwise */

3.      if $(e \in (S_{i,j} - \hat{S}_{i,j}) \vee e \in (\hat{S}_{i,j} - S_{i,j}))$ then $\phi := \phi(S_i)$;
     /*$S_i$ has a local state change at site $j$*/
4.      else    $\theta := 0$;
5.      return $\phi$;
end

FIG. 6

Procedure COMPUTECHARGE3$(e,j,E)$
Input: Element $e$ for whom to compute charge at site $j$; expression $E$.
Output: Charges $\phi_j^+(e)$ and $\phi_j^-(e)$
begin 1. Let $V$ be root of the expression tree $T$ for $E$;
    2. $C$:=CHARGETRIPLES$(e,j,V)$;
    3. $\phi^+$:=max$\{\phi(S_i) : S_i$ has a local state change $\Lambda(0,1,i) \in C\}$;
    4. $\phi^-$:=max$\{\phi(S_i) : S_i$ has a local state change $\Lambda(1,0,i) \in C\}$;
    5. return $[\phi^+,\phi^-]$;
end Procedure CHARGETRIPLES $(e,j,V)$
Input: Element $e$, site $j$ and node $V$ in expression tree $T$.
Output: Charge triple set for node $V$.
begin 1.    $C:=\emptyset$;
2.    if ($V$ is a leaf for stream $S_i$)
3.        Initialize $C$ as described in Table 1;
4.    else { /*$V$ is an internal node */
5.    Let $op$ :=$bool\_op(V)$;
6.    Let $V_1$ and $V_2$ be the two children of $V$ in $T$;
7.    $C_1$:=CHARGETRIPLES$(e,j,V_1)$;
8.    $C_2$:=CHARGETRIPLES$(e,j,V_2)$;
9.    for each pair $(a_1,b_1,x_1) \in C_1, (a_2,b_2,x_2) \in C_2$ do {
10.       $a:=a_1 op\ a_2$;
11.       $b:=b_1 op\ b_2$;
12.       $\delta_1 :=<\phi(S_{x1}),x_1>$;
13.       $\delta_2 :=<\phi(S_{x2}),x_2>$;
14.       if ($\delta_1 < \delta_2$) then $x := x_1$;
15.       else $x:=x_2$;
16.       $C:=C \cup \{(a,b,x)\}$;
17.    }
18. }
19. return $C$;
end

FIG. 7

DISTRIBUTED SET-EXPRESSION CARDINALITY ESTIMATION

FIELD OF THE INVENTION

The invention relates generally to information processing systems and, more particularly, to query processing in a distributed streaming environment.

BACKGROUND OF THE INVENTION

In distributed data streaming applications, rapid update streams originating at tens or hundreds of remote sites are continuously transmitted to a central processing system for online querying and analysis. Examples include monitoring of service provider network traffic statistics, telecommunication call detail records, Web usage logs, financial stock tickers, retail chain transactions, weather data, sensor data, and so on.

An important consideration in the above-mentioned monitoring applications is the communication overhead imposed by the distributed query processing architecture on the underlying network. Specifically, transmitting every update stream to a central site for processing can lead to inordinate amounts of message traffic, and thus have a crippling effect on the communication infrastructure as well as the central site processor.

For many distributed stream-oriented applications, exact answers are not required and approximations with guarantees on the amount of error suffice. The tradeoff between answer accuracy and communication overhead for specific classes of continuous queries over distributed update streams has been studied recently.

One approach considers aggregation queries that compute sums and averages of dynamically changing numeric values spread over multiple sources. In this approach, each site is assigned an interval of a certain width such that the sum of site interval widths is less than the application's total error tolerance. Thus, as long as the numeric value at each site stays within the interval for the site, no messages need to be sent by the sites in order to satisfy the application's accuracy requirements. However, in case the value at a site drifts outside the site's interval, the site is required to transmit the value to the central site and make appropriate adjustments to its interval.

Another approach focuses on the problem of continually tracking top-k values in distributed data streams; the developed techniques ensure the continuing validity of the current top-k set (at the central site) by installing arithmetic constraints at each site.

Unfortunately, most existing approaches for processing data streams are primarily concerned with exploring space-accuracy tradeoffs (mostly for single streams) rather than communication-accuracy tradeoffs in a distributed streams setting.

SUMMARY

The invention addressed various deficiencies in the prior art by providing methodologies pertaining to the problem of approximately answering set-expression cardinality queries over distributed streams originating at tens or hundreds of remote sites.

Various embodiments provide a method and system for answering set-expression cardinality queries while lowering data communication costs by utilizing a coordinator site to provide global knowledge of the distribution of certain frequently occurring stream elements to significantly reduce the transmission of element state information to the central site and, optionally, capturing the semantics of the input set expression in a Boolean logic formula and using models of the formula to determine whether an element state change at a remote site can affect the set expression result.

The inventive methodologies estimate set-expression cardinality with guaranteed accuracy at a central processing site, while keeping data communication costs between the remote sites and the central processor at a minimum. The inventive solutions exploit global knowledge of the distribution of frequent elements as well as the semantics of set expressions to reduce data transmission overhead while preserving user-specified error guarantees. The inventive methodologies and protocols efficiently propagate global frequency information across sites, and provide a logic-based formulation for identifying the element state changes (at a remote site) that can affect the set expression result (at the central site). The methodologies are effective in reducing the volume of message traffic.

Specifically, in one embodiment of the invention, a distributed framework for processing set-expression cardinality queries is provided wherein: each update stream site being allocated an error budget adapted to determine when the update stream site communicates stream state information to a central site; each update stream site associates a charge with every stream element that is inserted or deleted since stream state was previously transmitted to a central site; and each update stream site transmits current stream state information when the sum of its respective element charges exceeds its respective error budget.

BRIEF DESCRIPTION OF THE DRAWINGS

The teachings of the present invention can be readily understood by considering the following detailed description in conjunction with the accompanying drawings, in which:

FIG. 2 depicts a pseudo code representation of a coordinator site processing method according to an embodiment of the invention;

FIG. 3 depicts a pseudo code representation of a remote site processing method according to an embodiment of the invention;

FIG. 6-7 depicts a pseudo code representations of remote site charge computation routines according to various embodiments of the invention.

To facilitate understanding, identical reference numerals have been used, where possible, to designate identical elements that are common to the figures.

DETAILED DESCRIPTION OF THE INVENTION

Figure 1:
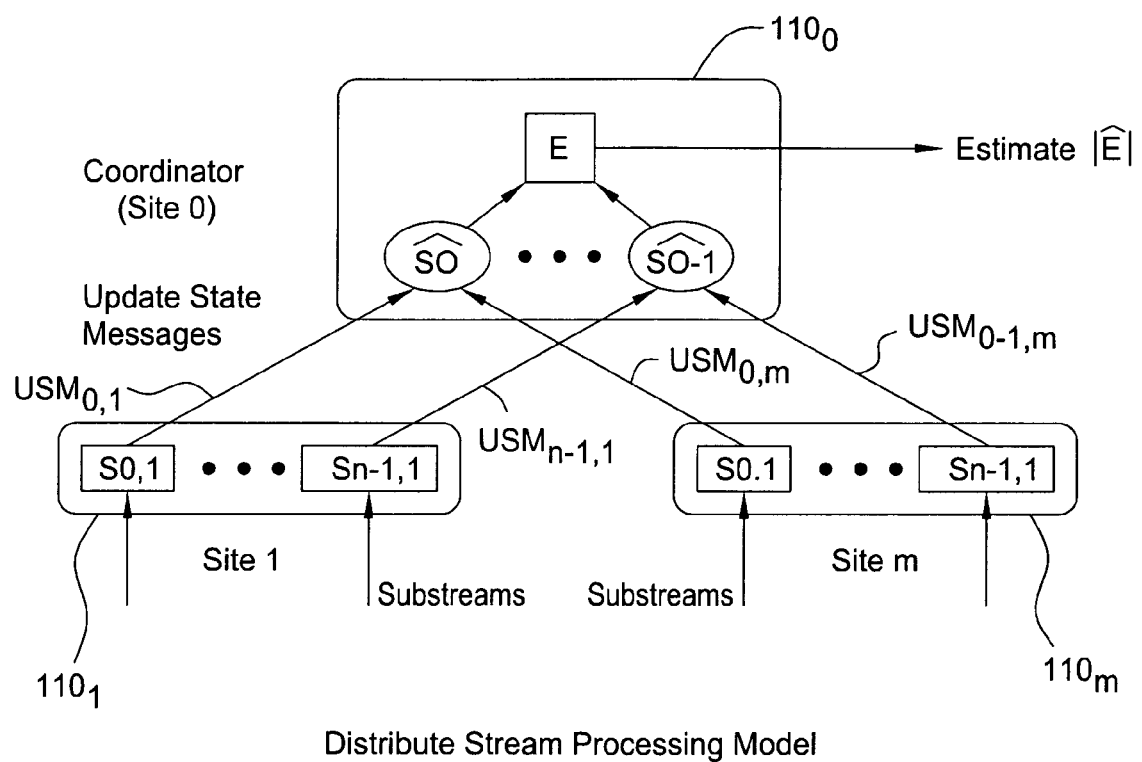
FIG. 1 depicts a distributed stream processing model according to an embodiment of the present invention.

The invention will be described within the context of distributed stream-oriented applications in which a relatively large number of remote sites provide update streams to a central site for processing.

The present invention is adapted to providing a distributed framework for processing set-expression cardinality queries. Each site or stream source is allocated an error budget which governs when the site communicates stream state information to the central processing site (e.g., for estimating set-expression cardinality). Each remote site associates a charge with every stream element that is inserted or deleted since stream state was last transmitted to the central site. Only when the sum of element charges at a site exceeds the site's error budget does the site communicate the current stream state information to the central site. The framework allows for flexibility in how elements are assigned charges as well as how site error budgets are allocated. Specifically, methods for computing charges are only required to satisfy certain basic properties needed for correctness in terms of providing the stipulated error guarantees. Methods that return smaller charges for elements are more desirable since they result in lower communication overhead.

In another embodiment of the invention, additional techniques that incorporate global knowledge to reduce communication are provided. In many distributed streaming environments, the frequency distribution of stream elements will be skewed with certain elements occurring more frequently than others. For example, in the flows collected from an ISP's border routers, IP addresses corresponding to popular Web sites like Yahoo, Google, Amazon and the like will be contained in a disproportionately large number of flows. If such a frequently occurring element (e.g., an IP address or other stream element) is inserted into a stream at a site (where it does not appear previously), there is no need to charge for it since the element must already be present at the central site and, therefore, the insert has no effect on the set-expression cardinality at the central site. Similarly, the charge for the deletion of a frequent element can be distributed across all the sites where the element occurs since the element would need to be deleted at all these sites to truly go away. Thus, global knowledge of frequent stream elements can lead to lower overall communication costs due to reduced element charges at each site. In one embodiment, protocols for disseminating this global information to the various sites while incurring minimal message overhead are provided.

In another embodiment of the invention, additional techniques that exploit set-expression semantics to reduce communication are provided. In this embodiment, the semantics of set expressions are exploited to obtain further reductions in element charges. For example, in the expression S∪T, if an element e is already present in stream S, then inserts and deletes of e from T have no effect on the set-expression result. Therefore, there is not need to charge for them. In this embodiment, a logic-based approach is provided where the conditions for a change in a set-expression result are captured in a Boolean formula. Models for the Boolean formula then represent scenarios for result changes and are used to compute element charges. Finally, in order to address the (provably required) large time complexity of model enumeration, the methodologies develop an efficient heuristic for computing element charges whose running time is polynomial in the number of streams.

It is noted that while the primary focus of the invention is estimating set-expression cardinality, the described techniques are quite powerful, and can also be used to approximate set expression results (i.e., sets of data elements) at a central site. This can be used by the coordinator to run other potentially complex queries on top of it, which could be more useful than just cardinality queries. For example, in the below DDoS scenario, the results could be filtered to identify malicious hosts, or in the below Akamai example, to identify users corresponding to certain traffic patterns.

It will be appreciated by those skilled in the art that the invention has broad applicability to distributed stream-oriented applications and query processing. For example, in wireless sensor networks (e.g., for environmental monitoring, inventory tracking, etc.), sensors tend to have a very limited battery life, and radio communication is much more expensive in terms of power consumption compared to processing. To ensure longer lifetimes for sensor nodes, it is critical to reduce the amount of data transmitted, even if that implies additional processing at the sensor nodes. Generally speaking, the invention is adapted to enable sufficiently accurate approximations to queries while avoiding excessive communication overhead within the distributed query processing architecture.

Another application is the problem of detecting distributed denial-of-service (DDoS) attacks by analyzing network flow information collected from an ISP's border routers. In a typical DDoS attack scenario, hundreds of compromised "zombie" hosts flood a specific victim destination with large numbers of seemingly legitimate packets. Furthermore, in order to elude source identification, attackers typically forge, or "spoof", the IP source address of each packet they send with a randomly-chosen address. Consequently, one approach for detecting DDoS attacks is to look for sudden spikes in the number of distinct IP source addresses observed in the flows across the ISP's border routers. The DDoS monitoring application does not require IP source address counts to be tracked with complete precision. Approximate counts can be equally effective for the purpose of discerning DDoS activity as long as errors are small enough so as to not mask abrupt changes in the true counts. Thus, depending on the accuracy requirements of the DDoS application, routers only need to transmit a subset of flow records to the central monitoring site.

As another example, consider a Web content delivery service such as that provided by Akamai (www.akamai.com). In this case, Web sites are replicated at a large number of geographically distributed servers, and users requesting access to a Web site are automatically redirected to the geographically closest server, or the least loaded server. Here, one might often be interested in tracking (approximately) the number of (distinct) users accessing a Web site (across all servers), the number of users who visit both a Web site A and Web site B, or the number of users who visit Web site A but not B. These statistics can be useful for determining the servers at which to replicate Web sites, deciding which advertisements to display at each Web site, and so on.

The problem of counting the number of distinct IP source addresses or web-site users, as discussed above, are special cases of the more general set-expression cardinality estimation problem, which is discussed in more detail herein. In this more general problem, of interest is estimating the number of distinct values in the result of an arbitrary set expression over distributed data streams. For example, in the DDoS scenario, in one embodiment is employed the set difference cardinality query |S−T| to detect significant traffic deviations. Specifically, S is the IP source address set for a sliding window spanning the past week (until now) and T is the set of IP source addresses from the week prior to that (e.g., two weeks ago). Similarly, in the Web example, if S and T are the sets of users who visit Web sites A and B, respectively, then the set intersection query |S∩T| yields the number of users who access both sites A and B.

System Model

This section describes a distributed update-stream processing architecture and formally defines the set-expression cardinality estimation problem addressed in this paper.

FIG. 1 depicts a distributed stream processing model according to an embodiment of the present invention. The distributed stream processing model 100 of FIG. 1 represents a distributed environment with m+1 sites and n n update streams. Stream updates arrive continuously at remote sites 1, . . . , m and site 0 is a special coordinator site that is responsible for generating answers to user (set expression cardinality) queries. It is assumed that there is no direct communication among remote sites, as is typical in most network monitoring applications (see, e.g., NOC example below). Optionally, more or fewer remote sites may be used, more coordinator sites may be used, the number of update streams sent from different remote sites may be the same or different, the sites may be arranged in a communication hierarchy where each site communicates only with its respective "parent" and "children" sites in the hierarchy. These and other modifications to the invention are envisioned by the inventor and will be appreciated by those skilled in the art and informed by the teachings of the present invention.

The model 100 of FIG. 1 provides a plurality of sites denoted as Site 0 ($110_0$), Site 1 ($110_1$) and so on up to Site m ($110_m$), collectively denoted as sites 110. In the model 100 of FIG. 1, the first site (i.e., Site 0) is utilized as a coordinator site, which receives a plurality of update state message (USM) streams from each of the remote sites 1 through m. Assuming n update state message streams for each site, the update state message streams are denoted for remote site 1 as $USM_{0,1}$ through $USM_{n-1,1}$, for remote site 2 as $USM_{0,2}$ through $USM_{n-1,2}$ and so on up to remote site m as $USM_{0,m}$ through $USM_{n-1,m}$.

Each remote site exchanges messages only with the coordinator, providing it with state information for streams at the site. Note that this distributed communication model is representative of a large class of real-life applications including network monitoring where a central Network Operations Center (NOC) is responsible for processing network traffic statistics collected at the switches and routers distributed across the network.

Figure 4:
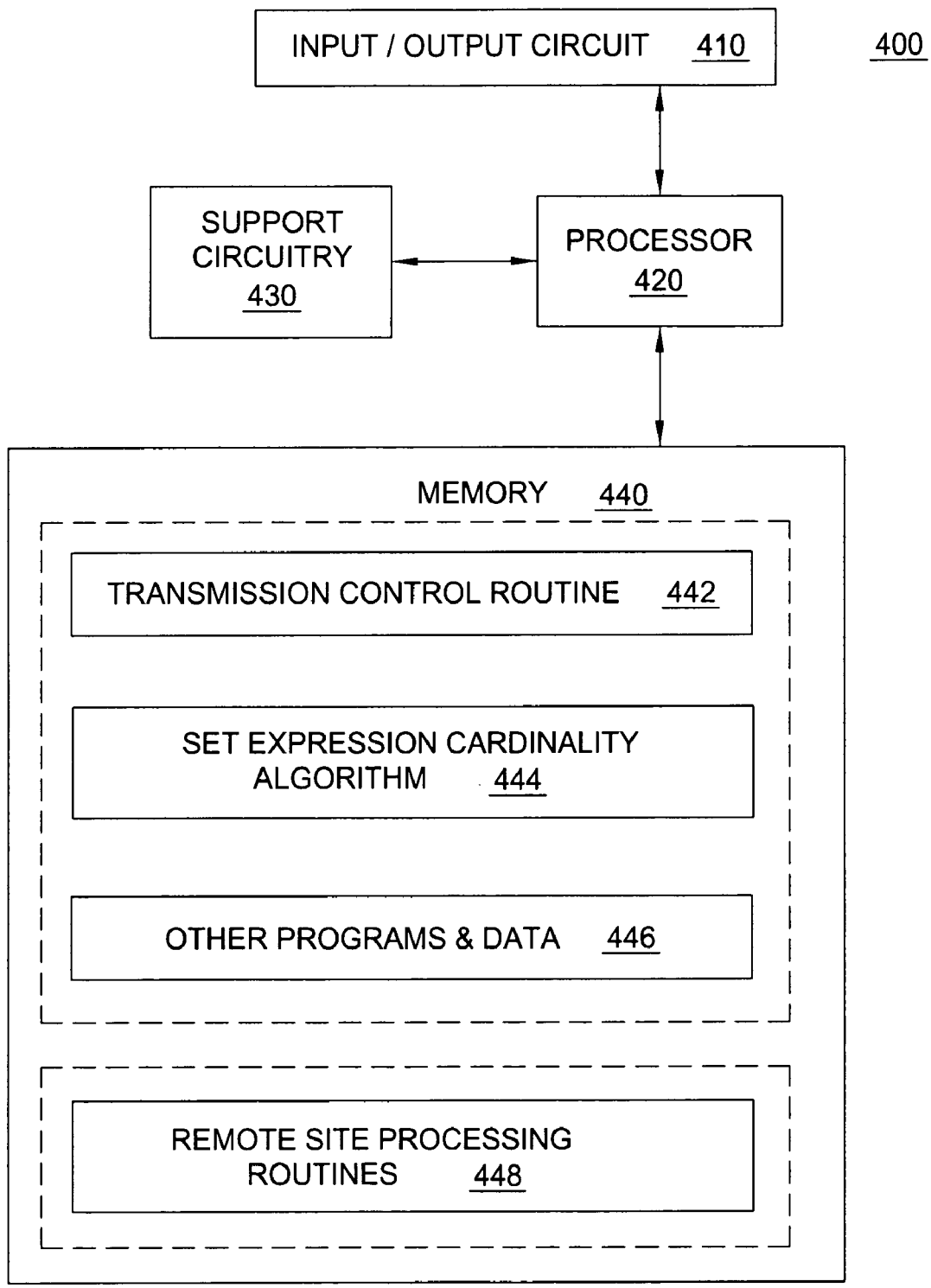
FIG. 4 depicts an processing architecture according to an embodiment of the present invention.

FIG. 4 depicts a processing architecture according to an embodiment of the present invention. Specifically, the processing architecture 400 of FIG. 4 may be used for a central site or for a remote site, depending upon the software included therein. The architecture of FIG. 4 is presented as a general purpose computing element adapted to perform the various stream processing tasks described herein. Moreover, while not discussed in detail herein, appropriate systems and apparatus for practicing the data structures, methodology and other aspects of the invention may be found in any system benefiting from the data processing and other techniques described herein.

Specifically, FIG. 4 comprises a processing architecture 400 including a processor 420 as well as memory 440 for storing various control programs and other programs as well as data. The memory 440 may also store an operating system supporting the various programs.

The processor 420 cooperates with conventional support circuitry 430 such as power supplies, clock circuits, cache memory and the like as well as circuits that assist in executing the software routine stored in the memory 440. As such, it is contemplated that some of the steps discussed herein as software processes may be implemented within hardware, for example as circuitry that cooperates with the processor 420 to perform various steps. The processing architecture 400 also contains input/output (I/O) circuitry 410 which forms an interface between the various functional elements communicating with the architecture 400.

The architecture 400 may be advantageously employed within the context of a network management system (NMS), an element management system (EMS) or any other network management system. More specifically, the architecture 400 may be utilized within the context of a coordinator site (110) and/or a remote site (120) within the model 100 of FIG. 1.

The invention may be implemented as a computer program product wherein computer instructions, when processed by a computer, adapt the operation of the computer such that the methods, data structures and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

Memory 440 is depicted as including, in one embodiment, coordinator site processing routines such as a transmission control routine 442, a set expression cardinality algorithm 444 and other programs and data 446. Memory 440 is depicted as including, in one embodiment, remote site processing routines 448. The various routines and related methodologies will be discussed below.

It will be appreciated by those skilled in the art and informed by the teachings of the present invention that while the memory 440 includes a plurality of data structures, algorithms and storage regions, there is no requirement within the context of the present invention that a single memory device as depicted be utilized within the context of the update-stream processing architecture. Specifically, any combination of internal, external and/or associated memory may be utilized to store the software instructions necessary to provide the various functions. Thus, while the architecture depicts the memory as an integral portion of a relatively unified structure, the memory 440 may in fact be distributed internal or external to the update-stream processing architecture 400.

Referring back to FIG. 1., at each remote site j, the n update streams render n distinct multi-sets $S_{0,j}, \ldots, S_{n-1,j}$ of elements from the integer domain $[M]=\{0, \ldots, M-1\}$. It is noted that other non-integer domains may also be utilized within the context of the present invention. Generally speaking, any finite domain may be used.

Each stream update at remote site j is a triple of the form $<i,e,\pm v>$ where i identifies the multi-set $S_{i,j}$ being updated, $e \in [M]$ is the specific data element whose frequency changes, and $\pm v$ is the net change in the frequency of e in $S_{i,j}$, i.e., "+v" ("-v") denotes v insertions (resp., deletions) of e. It is assumed that all deletions in the update streams are legal; that is, an update $<i,e,-v>$ can only be issued if the net frequency of e in $S_{i,j}$ is at least v. Note that delete operations help to substantially enrich the streaming model; for example, with deletions, the methodologies can easily handle sliding window queries by simply issuing a delete operation for each expired stream update that is no longer in the window of interest. For each i=0, . . . , n−1, let $S_i = \cup_j S_{i,j}$. Thus, $S_i$ reflects the global state of the $i^{th}$ update stream, while each multi-set $S_{i,j}$ captures the local state of stream i at site j. For purposes of simplicity, the terms $S_i$ and $S_{i,j}$ will be referred to as streams, though actual meaning of these terms is more precisely given as the current states of the underlying streams.

The invention is adapted to the problem of answering set-expression cardinality queries over the underlying collection of distributed update streams. Specifically, given a set expression E over streams $S_0, \ldots, S_{n-1}$ (with the standard set operators ∪, ∩ and − as connectives), the methodologies seek to estimate |E|, the number of distinct elements in E. For example, $|S_0 \cap S_1|$ is the number of distinct elements in the intersection of streams $S_0$ and $S_1$. If for m=2 remote sites, $S_{0,1}=\{a\}$, $S_{0,2}=\{a,b\}$, $S_{1,1}=\{b\}$ and $S_{1,2}=\{c\}$, then $S_0=\{a,b\}$ and $S_1=\{b,c\}$. Thus, $E = S_0 \cap S_1 = \{b\}$ and $|E|=1$.

The problem of estimating |E| at the coordinator is complicated because the substreams $S_{i,j}$ that comprise each distributed stream $S_i$ are distributed across the remote sites. Accurately tracking |E| by having remote sites continuously ship every stream update to the coordinator is clearly impractical for high data rate streams. Consequently, in order to reduce the burden on the communication infrastructure, the methodologies allow |E| to be approximated, but enforce a bound on the error in the final estimate. Specifically, for a pre-specified error tolerance $\epsilon$, the methodologies seek to compute an estimate $\hat{X}$ for X=|E| (at the coordinator) such that $X-\epsilon \leq \hat{X} \leq X+\epsilon$. The $\epsilon$ error parameter provides system designers with a useful knob that enables them to trade accuracy for efficiency. Essentially, the larger the error tolerance of an application, the smaller the communication overhead required to ensure that the estimate $\hat{X}$ meets the $\epsilon$ accuracy guarantee.

1. Estimating Single Stream Cardinality.

A distributed algorithm for the case when the expression E whose cardinality the methodologies wish to estimate is a single stream $S_i$ (which is the union of substreams $S_{i,j}$ at remote sites) will first be described. Thus, the methodologies are basically looking to estimate the number of distinct elements in stream $S_i$. The scheme for the distinct elements estimation problem illustrates the key concepts underlying the approach as well as the overall structure of the distributed solutions. In the next section, the methodologies will generalize the solution for a single stream to handle arbitrary set expressions.

The objective of the distributed algorithm is to be able to continuously estimate |E| at the coordinator site with $\epsilon$ accuracy. To achieve this, the methodologies distribute the error tolerance of $\epsilon$ among the m remote sites. The methodologies denote the error budget allocated to site j by $\epsilon_j$; thus, $\Sigma_j \epsilon_j = \epsilon$. While there are multiple ways to allocate error budgets to sites, a simple approach is to allocate these proportional to the stream update rates at the sites. Another approach is to distribute the error budget uniformly across the remote sites. In an alternate embodiment, any scheme may be used as long as the following invariant is satisfied: $\Sigma_j \epsilon_j = \epsilon$ and for all j, $\epsilon_j \geq 0$.

The error parameter $\epsilon_j$ essentially dictates when site j sends the current states of substreams $S_{i,j}$ at site j to the coordinator. The methodologies denote by $\hat{S}_{i,j}$, the most recent state of substream $S_{i,j}$ communicated (by site j) to the coordinator. In addition to $\hat{S}_{i,j}$, site j also stores in its local memory, the transmitted states $\hat{S}_{i,j}$ for substreams at the site. For each stream $S_i$, the coordinator constructs the global state $\hat{S}_i$ by taking the union of all the local substream states $\hat{S}_{i,j}$ received from the remote sites. Thus, $\hat{S}_i = \mathring{A}_j \hat{S}_{i,j}$. Now let $\hat{E}$ be the result of evaluating expression E on the states $\hat{S}_i$ instead of $S_i$. The coordinator estimates the cardinality of set expression E as $|\hat{E}|$.

Generally speaking, if remote sites have limited memory, then the methodologies are optionally modified to store a compact sketch synopsis for each substream (instead of the complete substream state). Techniques associated with the compact sketch synopsis are described in more detail in U.S. patent application entitled METHOD FOR DISTINCT COUNT ESTIMATION OVER JOINS OF CONTINUOUS UPDATE STREAMS, Ser. No. 10/957,185 which is incorporated herein by reference in its entirety. In this embodiment each remote site keeps track of its respective substream states. Briefly, the JD Sketch techniques are adapted to maintaining a summary of a first continuous stream of tuple updates by hashing tuples received from the first continuous data stream according to at least one initial attribute, and for each bucket of the at least one initial attribute, generating a corresponding set of 2-level hash sketches according to at least one other attribute. The JD Sketch synopsis data structure is not a standard hash table. It may be conceptualized as a hash table having buckets which additionally include second level hash structures adapted to capture information pertaining to the set of elements of a stream. That is, only a summary of the set of information mapping to each hash table bucket is actually kept in the bucket. This summary hash table bucket summary may comprise, illustratively, a set of 2-level hash sketch synopses. Thus, each hash table bucket stores a corresponding set of hash tables of those data elements that map or "collide" into the hash table bucket.

Other synopsis structures may be used to maintain a summary of update stream data prior to transmission of that data from a remote site, such as 2-level or multiple level hash structures.

Generally speaking, any means of maintaining a summary or reduced size representation of the underlying update stream may be advantageously employed within the context of the present invention. In one embodiment, a delete resistant sampling scheme (such as the JD Sketch scheme) is used. A delete resistant sampling scheme comprises any sampling scheme which takes as an input a stream of inserts and deletes of elements and outputs a distinct sample (of a given size) of the stream which is identical (with high probability) to the sample that would be obtained if the deleted elements were never inserted to begin with.

In order to guarantee that the estimate $|\hat{E}|$ is correct, the methodologies ensure that $|E|-\epsilon \leq |\hat{E}| \leq |E|+\epsilon$. A simple approach for ensuring this for $E=S_i$ is as follows. At each remote site j, if either of $|S_{i,j}-\hat{S}_{i,j}|$ or $|\hat{S}_{i,j}-S_{i,j}|$ exceeds $\epsilon_j$, then site j sends the most recent state $S_{i,j}$ to the coordinator. One can easily show that this simple scheme guarantees that at all times, $|E-\hat{E}| \leq \epsilon$ and $|\hat{E}-E| \leq \epsilon$, and is thus correct. For instance, consider an element e in $E-\hat{E}$. The element must belong to $S_{i,j}-\hat{S}_{i,j}$ at some site j, and since $|S_{i,j}-\hat{S}_{i,j}| \leq \epsilon_j$, it must be counted against the error budget $\epsilon_j$ at site j. As a result, since $\Sigma_j \epsilon_j = \epsilon$, the methodologies get that $|E-\hat{E}| \leq \epsilon$. Further, since $|E|-|\hat{E}| \leq |E-\hat{E}|$, the methodologies obtain that $|E|-|\hat{E}| \leq \epsilon$. Similarly, it is possible to show that $|\hat{E}|-|E| \leq \epsilon$, and thus the estimate $|\hat{E}|$ is within $\epsilon$ error of $|E|$.

The above scheme associates a charge $\phi_j(e)$ with each element e at every remote site j, and if the total of these charges exceed $e_j$, then the remote site communicates state information to the coordinator. More formally, let $\phi_j^+(e)=1$ if $e \in (S_{i,j}-\hat{S}_{i,j})$, $\phi_j^-(e)=1$ if $e \in (\hat{S}_{i,j}-S_{i,j})$, and $\phi_j^+(e)=\phi_j^-(e)=0$, otherwise. As a result, $\Sigma_e \phi_j^+(e)=|S_{i,j}-\hat{S}_{i,j}|$ and $\Sigma_e \phi_j^-(e)=|\hat{S}_{i,j}-S_{i,j}|$. Thus, there is a message exchange between site j and the coordinator if either $\Sigma_e \phi_j^+(e) > \epsilon_j$ or $\Sigma_e \phi_j^-(e) > \epsilon_j$.

In the above scheme, element charges are computed based entirely on the local state information available at each site. The methodologies next show that by exploiting global knowledge about element e, the methodologies can reduce the charge $\phi_j(e)$ for e, and as a consequence, the overall message traffic between remote sites and the coordinator.

A key observation made by the present inventors is that in many stream-oriented domains, there will be a certain subset of globally "popular" elements. For instance, in an IP network monitoring scenario, destination IP addresses corresponding to popular Web sites like Yahoo, Amazon, Google etc. will frequently appear in the flow records collected from network routers. An important characteristic of each such globally popular element is that, at any given point in time, it will appear in substreams at multiple sites although the exact sites that contain the element may vary over time.

Assuming, for a popular element e, each remote site (approximately) knows the number of substream states $\hat{S}_{i,j}$ that contain e. Specifically, for stream $S_i$, let $\theta_i(e) \geq 1$ be a lower bound on the number of sites for which e appears in the $\hat{S}_{i,j}$ states communicated to the coordinator. Then, even if element e is newly inserted into $S_{i,j}$ at site j (that is, $e \in (S_{i,j} - \hat{S}_{i,j})$), the methodologies should not charge for it since e is already in $\hat{S}_i$ and, thus, cannot possibly be in $S_i - \hat{S}_i$. Similarly, if e is deleted from $S_{i,j}$ at site j (that is, $e \in (\hat{S}_{i,j} - S_{i,j})$), then in order for e to be deleted from $S_i$ and thus be in $S_1 - S_i$, e, must be deleted from $S_{i,j}$ at least $\theta_i(e)$ sites. Thus, it suffices to charge $\phi_j^-(e) = 1/\theta_i(e)$ (instead of 1) for the local delete of e at each site j. This way, if local deletions at the $\geq \theta_i(e)$ sites cause e to be globally deleted (that is, $e \in (\hat{S}_i - S_i)$), then the cumulative charge $\Sigma_j \phi_j^-(e)$ for e across the sites is at least 1. As a result, since $\Sigma_e \phi_j^-(e) \leq \epsilon_j$ at each site j, this total charge of 1 is counted against the various $\epsilon_j$s, and correctness is not compromised.

2. Distributed Algorithm.

The details of a distributed scheme for producing a correct cardinality estimate $|\hat{E}|$ at the coordinator will now be described. For each element $e \in \hat{S}_i$, the coordinator maintains a count $C_i(e)$ of the number of remote sites whose states $\hat{S}_{i,j}$ contain the element e. Elements whose counts $C_i(e)$ exceed a threshold $\tau$ are considered to be frequent, and added to a frequent element set $F_i$ for stream $S_i$. The coordinator also uses the count $C_i(e)$ for each element $e \in F_i$ to compute a lower bound threshold $\theta_i(e)$ such that the invariant $C_i(e) \geq \theta_i(e)$ always holds. It continuously communicates changes in the frequent element sets $F_i$ and the threshold values $\theta_i(e)$ to the remote sites so that these can be used to compute element charges $\phi_j(e)$ at the sites (as described in the previous subsection). Thus, in order to keep the message overhead under control, the coordinator does not send exact element counts $C_i(e)$ to remote sites, but rather disseminates the thresholds, as described in the paragraph below. Each remote site j keeps track of the sum of local element charges $\Sigma_e \phi_j(e)$ in variable $\Phi_j$. Further, when $\Phi_j$ becomes greater than $\epsilon_j$, it sends the deltas $\Delta_i^+ = S_{i,j} - \hat{S}_{i,j}$ and $\Delta_i^- = \hat{S}_{i,j} - S_{i,j}$ that capture the local state changes for substream $S_{i,j}$ since site j last transmitted state information to the coordinator. (Note that the deltas are sets and not multi-sets).

Coordinator Site Actions.

FIG. 2 depicts the actions performed by the coordinator (e.g., Site 0 of FIG. 1) when it receives the deltas $\Delta_i^+$ and $\Delta_i^-$ for substream $S_{i,j}$ from site j. The coordinator employs the received deltas to first update element counts $C_i(e)$ and the stream state $\hat{S}_i$ stored at the coordinator. As previously noted, the sets $\hat{S}_i$ are used to generate the final estimate $|\hat{E}|$. It then uses the new counts $C_i(e)$ to adjust the frequent element set $F_i$, and the threshold values $\theta_i(e)$ for frequent elements. It also informs all the remote sites of changes to $F_i$ and $\theta_i(e)$ by sending them "make frequent" and "adjust threshold" control messages, which trigger the remote sites to apply the same changes to their local copies of $F_i$ and $\theta_i(e)$. The control messages thus ensure that the values of $F_i$ and $\theta_i(e)$ are synchronized between the coordinator and remote sites.

The correctness of the distributed scheme is noted by the fact that for each element $e \in F_i$, the threshold value $\theta_i(e)$ is always a lower bound on the number of sites j for whom e is in the local state $\hat{S}_{i,j}$ sent to the coordinator. Thus, the scheme for modifying $F_i$ and $\theta_i(e)$ needs to preserve the invariant $C_i(e) \geq \theta_i(e)$ while controlling the number of messages between the coordinator and remote sites. Clearly, to maintain the invariant, the coordinator needs to send messages to all sites every time the count $C_i(e)$ drops below the current threshold $\theta_i(e)$ for an element $e \in F_i$. Consequently, in order to prevent minor fluctuations in the value of $C_i(e)$ from generating excessive amounts of control message traffic, one strategy is to try and keep a sufficient gap between $C_i(e)$ and $\theta_i(e)$. Thus, for instance, if $C_i(e)$ becomes less than $\theta_i(e)$, then the methodologies simply halve the value of $\theta_i(e)$ (or reduce by some amount other than a factor of 2). Similarly, the methodologies double (or increases by some amount other than a factor of 2) the value of $\theta_i(e)$ only when $C_i(e)$ exceeds $4\theta_i(e)$, and (conservatively) consider an element to be frequent only if $C_i(e)$ exceeds $2\tau$. It is noted that other schemes can be used to propagate global knowledge of element counts, as long as the invariant $C_i(e) \geq \theta_i(e)$ is satisfied. For efficiency purpose, it may be desirable to choose schemes that minimize the number of control messages used to propagate the global count information.

An additional mechanism used in optional embodiment of the invention has been found by the inventors to be effective for keeping the volume of control messages low. Specifically, to double $\theta_i(e)$ only after the count $C_i(e)$ is somewhat stable (that is, has stayed above $3\theta_i(e)$ for a certain time period after crossing $4\theta_i(e)$). Using this strategy, the number of control messages is relatively insensitive to the value of the threshold parameter $\tau$. Finally, observe that while increasing $\theta_i(e)$ is not required for preserving the invariant $C_i(e) \geq \theta_i(e)$, larger $\theta_i(e)$ values are key to reducing the charges $\phi_j(e)$ that sites incur for elements.

Remote Site Actions.

FIG. 3 depicts the actions performed by a remote site j (e.g., the $j^{th}$ remote site of FIG. 1) when an element e is inserted into or deleted from $S_{i,j}$ (due to a stream update), or the frequent set $F_i$ or threshold value $\theta_i(e)$ gets modified (due to a "make frequent" or "adjust threshold" control message for e from the coordinator). Essentially, remote site j computes new charges $\phi_j^+(e)$ and $\phi_j^-(e)$ for e, and appropriately adjusts the total site charges $\Phi_j^+$ and $\Phi_j^-$. Further, if either of these charges exceeds $\epsilon_j$, the deltas for all substreams $S_{i,j}$ are sent to the coordinator; thus, $\hat{S}_{i,j} = S_{i,j}$, and consequently, all charges $\phi_j(e)$ are reset to 0. It is noted that sending the deltas for all 'other' substreams to the coordinator is not required when the expression $E = S_i$ since there is only one substream at each site, but is needed for the more general set expressions considered in the next section.

The procedure COMPUTECHARGE in FIG. 3 is adapted for use in the single stream case (that is, $E = S_i$). Described later are alternate charge computation procedures that apply to general set expressions. Generally speaking, COMPUTECHARGE associates a charge of 1 for non-frequent elements that are newly inserted into or deleted from $S_{i,j}$ since the last message to the coordinator. For frequent elements $e \in F_i$, charge $\phi_j^+(e) = 0$ if e is newly inserted, and charge $\phi_j^-(e) = 1/\theta_i(e)$ if e is locally deleted.

Correctness Argument.

For ease of exposition, in the arguments pertaining to the correctness of the distributed scheme, it is assumes that all message transmissions and the actions they trigger are performed instantaneously. While not a perfect assumption, the scheme can be extended to simulate such an instantaneous execution (at a logical level) by having sites send special acknowledgements for messages once all the actions triggered by the messages have completed. Additional details are provided in U.S. patent application entitled METHOD FOR DISTINCT COUNT ESTIMATION OVER JOINS OF CONTINUOUS UPDATE STREAMS, Ser. No. 10/957,185 which is incorporated herein by reference in its entirety.

The charges $\phi_j^+(e)$ and $\phi_j^-(e)$ computed by COMPUTECHARGE can be shown to satisfy the following two invariants:

For each $e \in E - \hat{E}, \Sigma_j \phi_j^+(e) \geq 1$     (equation 1)

For each $e \in \hat{E} - E, \Sigma_j \phi_j^-(e) \geq 1$     (equation 2)

Thus, the distributed scheme is correct because it can be shown that Equation (1) implies that $|E|-\epsilon \leq |\hat{E}|$ and Equation (2) implies that $|\hat{E}| \leq |E| + \epsilon$. Moreover, as discussed earlier, the space usage of the distributed algorithm can be reduced by storing a compact sketch synopsis for each substream $S_{i,j}$ instead of the entire substream state. This scheme provides probabilistic as opposed to deterministic error guarantees. For instance, it can maintain a (delete-resistant) distinct sample for each substream, and use the substream samples in place of the substream states in our distributed scheme.

Estimating Cardinality of Arbitrary Set Expressions

The previously described methodologies will now be applied to the problem of estimating (to within e absolute error) the cardinality of an arbitrary set expression E involving the distributed update streams $S_0, \ldots, S_{n-1}$. The distributed scheme for general set expressions is identical to the scheme for single streams except for the charging procedure COMPUTECHARGE. Thus, as previously noted, for each stream $S_i$, the coordinator maintains the states $S_i$, the frequent sets $F_i$, and the threshold values $\theta_i(e)$ for the number of sites j whose shipped state $\hat{S}_{i,j}$ contains element e. The cardinality estimate at the coordinator is $|\hat{E}|$, where $\hat{E}$ is the result of evaluating expression E using $\hat{S}_i$ instead of $S_i$. The coordinator processes the deltas from a remote site for an arbitrary stream $S_i$ as described in procedure COORDINATOR (see FIG. 2). Similarly, site j executes the actions described in procedure REMOTE (see FIG. 3) every time there is a change in the substream state $S_{i,j}$, the frequent set $F_i$, or the local threshold value $\theta_i(e)$.

In one embodiment of the charging procedure for the single stream case, the methodologies charged 1 for inserts and deletes of elements $e \notin F_i$, and if $e \in F_i$, inserts were free (i.e., not charged) and deletes were charged $1/\theta_i(e)$. However, when E contains multiple streams, computing the charge $\phi_j(e)$ for an element e is more involved since e may be concurrently inserted/deleted from more than one substream $S_{i,j}$ at site j. In one embodiment, this complication is overcome by setting the charges $\phi_j^+(e) = \phi_j^-(e) = 1$ if, for any of the substreams $S_{i,j}$, either $e \in (S_{i,j} - \hat{S}_{i,j})$ or $e \in (\hat{S}_{i,j} - S_{i,j})$. However, while this scheme is correct it may be too conservative in some applications, and may end up overcharging in some situations. This, in turn, could lead to frequent state transmission messages from remote sites to the coordinator. It is noted that any scheme satisfying the invariants of equations 1 and 2 can be used to determine element charges. However, for efficiency purposes (i.e., to minimize communication) it is desired to use a scheme that allocates as low a charge as possible to inserts and deletes of elements.

Example 1

Consider distributed streams $S_1$, $S_2$, and $S_3$, and let expression $E = S_1 \cap (S_2 - S_3)$. For element e at site j, let $e \in \hat{S}_{3,j}$ and $e \in S_{3,j}$. Clearly, $e \in S_3$ and $e \in \hat{S}_3$, and thus $e \notin E$ and $e \notin \hat{E}$. As a result, even if $e \in (\hat{S}_{1,j} - S_{1,j})$ or $e \in (S_{2,j} - \hat{S}_{2,j})$, the methodologies should not charge for element e at site j since e cannot possibly be in either $E - \hat{E}$ or $\hat{E} - E$; thus, based on the semantics of expression E, setting the charges $\phi_j^+(e) = \phi_j^-(e) = 0$ will still ensure correctness.

As will be discussed below, for an arbitrary set expression E, the methodologies focus on the problem of computing the minimum possible charges $\phi_j^+(e)$ and $\phi_j^-(e)$ for a fixed element e at site j by leveraging the semantics of expression E. The various charging schemes ensure that charges $\phi_j^+(e)$ and $\phi_j^-(e)$ satisfy Equations (1) and (2), and thus provide an accuracy guarantee of $\epsilon$ for the final estimate $|\hat{E}|$.

The first charging method is denoted as a Model-Based Charging Scheme, and is based on enumerating models for a Boolean formula corresponding to expression E. Finding the optimal charge under the scheme can be shown to be NP Hard and, thus, has an exponential time complexity. The methodologies develop a heuristic that at the expense of overcharging in some situations described later below is able to eliminate model enumeration altogether, and bring down the time complexity so that it is polynomial in the number of streams.

The methodologies developed by the inventors provide that a stream $S_i$ has a local state change at site j if either $e \in (S_{i,j} - \hat{S}_{i,j})$ or $e \in (\hat{S}_{i,j} - S_{i,j})$. Similarly, the methodologies provide that a stream $S_i$ has a global state change if either $e \in (S_i - \hat{S}_i)$ or $e \in (S_i - \hat{S}_i)$.

A Model-Based Charging Scheme

The charging procedure first constructs a Boolean formula $\Psi_j$ that captures the semantics of expression E and local stream constraints at each site j. It then defines the charge $\phi_j(e)$ at site j in terms of the charges for models M that satisfy $\Psi_j$.

In one embodiment to construct the Boolean formula, for each stream $S_i$, let $p_i$ and $\hat{p}_i$ be Boolean variables with semantics $e \in S_i$ and $e \in \hat{S}_i$, respectively. The methodologies construct two Boolean formulae $\Psi_j^+$ and $\Psi_j^-$ over the variables $p_i$ and $\hat{p}_i$. Intuitively, $\Psi_j^+$ and $\Psi_j^-$ specify the conditions that stream states $S_i$ and $\hat{S}_i$ must satisfy for $e \in (E - \hat{E})$ and $e \in (\hat{E} - E)$, respectively. The formulae also capture constraints on $S_i$ and $\hat{S}_i$ due to local knowledge at site j of the substream states $S_{i,j}$, $\hat{S}_{i,j}$, and threshold values $\theta_i$. For example, if $e \in S_{i,j}$, then it must be the case that $e \in S_i$ (since $S_i = \cup_j S_{i,j}$), and thus, variable $p_i$ must be true.

The formulae $\Psi_j^+$ and $\Psi_j^-$ are built using the following three formulae: (1) an Expression formula $F_E$ representing the logic of expression E, (2) State formulae $\hat{G}_j, G_j$ that model the local knowledge that site j has about stream states $S_i$ and $\hat{S}_i$, and (3) a Threshold formula H that captures the constraints due to the thresholds $\theta_i$ for each stream $S_i$.

Expression Formula.

The expression formula $F_E$ is constructed recursively as follows:

1. For every stream in $S_i$ in E, the methodologies replace its occurrence by the Boolean variable $p_i$;
2. The expression $E_1 \cup E_2$ is translated as $F_{E_1} \vee F_{E_2}$;
3. The expression $E_1 \cap E_2$ is translated as $F_{E_1} \wedge F_{E_2}$; and
4. The expression $E_1 - E_2$ is translated as $F_{E_1} \wedge (\neg F_{E_2})$.

For example, the set expression $E = S_1 \cap (S_2 - S_3)$ is translated into the Boolean formula $F_E = p_1 \wedge (p_2 \wedge \neg p_3)$. It is then seen that element $e \in E$ if $F_E$ is true for the stream states $S_i$. For instance, $e \in S_1 \cap (S_2 - S_3)$ if $e \in S_1 \wedge (e \in S_2 \wedge e \notin S_3)$. Formula $\hat{F}_E$ is constructed similarly, except that variables $p_i$ are replaced by $\hat{p}_i$.

State Formula.

The state formulae $G_j$ and $\hat{G}_j$ are conjunctions of a subset of the Boolean variables $p_i$ and $\hat{p}_i$, respectively. In one embodiment, if $e \in S_{i,j}$, then variable $p_i$ is added to $G_j$. Thus, $G_j$ captures the constraints on streams $S_i$ for whom the methodologies can infer that $e \in S_i$ based on local information that $e \in S_{i,j}$ at site j. Similarly, the methodologies construct $\hat{G}_j$ by adding variable $\hat{p}_i$ to it if $e \in \hat{S}_{i,j}$. Note that $G_j$ and $\hat{G}_j$ may be different for the various remote sites depending on the substream states at each site.

Threshold Formula.

The threshold formula H only applies to Boolean variables $\hat{p}_i$. If $e \in F_i$ for stream $S_i$, then the methodologies add variable $\hat{p}_i$ to H. Thus, H captures the constraints on stream states $\hat{S}_i$ for whom the methodologies can deduce that $e \in \hat{S}_i$ from the frequent element sets. Note that formula H is identical at all sites since $F_i$ is the same at all sites. That is, the above protocol generally is adapted to the condition in which the set of frequent elements $F_i$ is identical across all sites. However, in an alternate protocol the set of frequent elements $F_{i,j}$ need not be identical across all sites. In this alternate protocol, the coordinator needs to maintain the invariant $C_i(e) \geq \theta_{i,j}(e)$ for all j.

The formulae $\Psi_j^+$ and $\Psi_j^-$ at site j are constructed as follows.

$$\Psi_j^+ = (\neg \hat{F}_E \wedge F_E) \wedge (\hat{G}_j \wedge G_j \wedge H)$$

$$\Psi_j^- = (\hat{F}_E \wedge \neg F_E) \wedge (\hat{G}_j \wedge G_j \wedge H)$$

The formulae $\Psi_j^+$ and $\Psi_j^-$ comprise two parts. The first part, involving $F_E$ and $\hat{F}_E$, captures the conditions for one of $e \in (E-\hat{E})$ or $e \in (\hat{E}-E)$ to hold. The second part $(\hat{G}_j \wedge G_j \wedge H)$ specifies the constraints on stream states $\hat{S}_i$ and $S_i$ due to local knowledge at site j of substream states and frequent element sets. Thus, for the Boolean formula $\Psi_j^+$, it follows that $e \in (E-\hat{E})$ if $\Psi_j^+$ is true for stream states $\hat{S}_i, S_i$. Consequently, if $\Psi_j^+$ is unsatisfiable, then it is impossible that $e \in (E-\hat{E})$, and so the methodologies can set $\phi_j^+(e)=0$. Similarly, if $\Psi_j^-$ is unsatisfiable, then charge $\phi_j^-(e)=0$.

Revisiting Example 1, where $E=S_1 \cap (S_2-S_3)$, and element $e \in \hat{S}_{3,j}$ and $e \in S_{3,j}$, the methodologies get that $\Psi_j^+ = (\neg \hat{p}_1 \vee \neg \hat{p}_2 \vee \hat{p}_3) \wedge (p_1 \wedge p_2 \wedge \neg p_3) \wedge (\hat{p}_3 \wedge p_3)$. It is noted that $\Psi_j^+$ is unsatisfiable (due to $\neg p_3 \wedge p_3$), and thus, charge $\phi_j^+(e)=0$. In the following discussion, the methodologies show how models for $\Psi_j$ can be used to compute the charges $\phi_j^+(e)$ when $\Psi_j$ is satisfiable.

Computing Charges Using Formula.

As an overview, consider the problem of computing the charge $\phi_j^+(e)$. For an arbitrary Boolean formula over $\hat{p}_i, p_i$, the methodologies define a model to be an arbitrary subset of $\cup_i \{p_i, \hat{p}_i\}$. Each model M assigns truth values to variables $p_i$, $\hat{p}_i$ with variable $p_i(\hat{p}_i)$ being assigned true if $p_i \in M$ (resp., $\hat{p}_i \in M$); otherwise, $p_i$(resp., $\hat{p}_i$ I) is assigned false. The methodologies say that model M satisfies a Boolean formula if the formula evaluates to true for the truth assignment specified by M. For example, model $\{\hat{p}_1, p_2\}$ satisfies the formula $\hat{p}_1 \wedge p_2$, but the model $\{\hat{p}_1\}$ does not. Now, each model M represents a specific scenario for states $\hat{S}_i, S_i$. Essentially, $e \in S_i(e \in \hat{S}_i)$ if $p_i \in M$ (resp., $\hat{p}_i \in M$). If $e \in (E-\hat{E})$ for stream states $S_i, \hat{S}_i$, then the model corresponding to these states must satisfy $\Psi_j^+$. Further, every model M that satisfies $\Psi_j^+$ represents (from the local viewpoint of site j) a possible scenario for states $\hat{S}_i, S_i$ that is consistent with local substream states at site j, and in which $e \in (E-\hat{E})$.

This model-based approach assigns a charge $\phi_j(M)$ to each model M that satisfies $\Psi_j^+$ at site j. Furthermore, since as far as site j is concerned, any of these models can potentially occur and cause $e \in (E-\hat{E})$, the methodologies set charge $\phi_j^+(e)$ as follows.

$$\phi_j^+(e) = \max\{\phi_j(M): \text{Model } M \text{ satisfies } \Psi_j^+\} \quad \text{(equation 3)}$$

As previously noted, if $e \in (E-\hat{E})$, then $\Sigma_j \phi_j^+(e) \geq 1$. Thus, by choosing the charge $\phi_j(M)$ for each model M such that $\Sigma_j \phi_j^+(M) \geq 1$ if M were to occur, the methodologies can ensure that $\Sigma_j \phi_j^+(e) \geq 1$ if $e \in (E-\hat{E})$ due to some model M that satisfies $\Psi_j^+$.

To compute the charge $\phi_j(M)$ for a model M that satisfies $\Psi_j^+$ let P be the set of streams $S_i$ such that exactly one of $p_i$ or $\hat{p}_i$ belongs to M, i.e., either $\{p_i, \hat{p}_i\} \cap M = \{p_i\}$ or $\{p_i, \hat{p}_i\} \cap M = \{\hat{p}_i\}$. Thus, P is the set of streams that experience a global state change in model M. In an exemplary model-based scheme, site j selects a single "culprit" stream $S_i$ from P using a selection mechanism that satisfies the following property:

UNIFORM CULPRIT SELECTION PROPERTY: Given a model M and a set P of streams with global state changes in M, every site selects the same culprit stream $S_i \in P$ for M.

As further discussed below, a specific culprit selection scheme satisfying the above property that attempts to minimize the magnitude of the charge $\phi_j^+(e)$ at site j will be provided. For the selected culprit stream $S_i$, let charge $\phi(S_i)$ be defined as follows:

$$\phi(S_i) = \begin{cases} 1/\theta_i(e) & \text{if } e \in F_i \\ 1 & \text{otherwise} \end{cases} \quad \text{(equation 4)}$$

The reciprocal of this charge $1/\phi(S_i)$ is the lower bound on the number of sites where stream $S_i$ must have local state changes for it to have a global state change. For instance, if $e \in F_i$, then for e to be in $(\hat{S}_i - S_i)$, e must be in $(\hat{S}_{i,j} - S_{i,j})$ for at least $1/\phi(S_i) = \theta_i(e)$ sites. The methodologies define the charge $\phi_j^+(M)$ for model M in terms of the charge $\phi(S_i)$ for the culprit stream $S_i$, as follows:

$$\phi_j(M) = \begin{cases} \phi(S_i) & \text{if culprit stream } S_i \text{ has a local state change at site } j \\ 0 & \text{otherwise} \end{cases} \quad \text{(equation 5)}$$

Thus, the methodologies are able to ensure that if model M indeed does occur, then since the culprit stream $S_i$ has a global state change in M, at least the $1/\phi(S_i)$ sites j at which $S_i$ has local state changes, choose $\phi_j(M)=\phi(S_i)$ and thus, $\Sigma_j \phi_j(M) \geq (1/\phi(S_i))\phi(S_i) \geq 1$.

The correctness of the charging scheme follows from Lemma 1 below.

Lemma 1: Let charge $\phi_j^+(e)$ be computed as described in Equations (3), (4) and (5), and the culprit stream $S_i$ for each model M selected using a scheme that satisfies the uniform culprit selection property. If $e \in (E-\hat{E})$, then $\Sigma_j \phi_j^+(e) \geq 1$. (An analogous lemma holds for $\phi_j^-(e)$.)□

Culprit Selection. For a model M, in one embodiment a culprit selection scheme is implemented as follows: lexicographically order streams $S_i \in P$ based on charge, index pairs $\langle \phi(S_i), i \rangle$, and choose the smallest stream in the lexicographic ordering as the culprit. In other words, the culprit stream is the stream with the minimum charge $\phi(S_i)$, with ties being broken in favor of the stream with the smallest index. Since the charge $\phi(S_i)$ for stream $S_i$ is the same across all the sites, the simple culprit selection scheme satisfies the uniform culprit selection property. Thus, due to Lemma 1, the charging procedure is correct. Also, the charging procedure selects the stream with the smallest charge as the culprit for model M, it minimizes the maximum charge incurred for M across the sites.

Example 2

Consider distributed streams $S_1$, $S_2$ and $S_3$, and let expression $E=S_1 \cap (S_2-S_3)$. At some site j, let the substream states be as shown in the table below.

|  | i = 1 | i = 2 | i = 3 |
|---|---|---|---|
| $\hat{S}_{i,j}$ |  | e | e |
| $S_{i,j}$ | e | e |  |

Thus, element e is in all substream states except for $\hat{S}_{1,j}$ and $S_{3,j}$. Also, let $e \in F_3$, $e \notin F_1$, $e \notin F_2$ and $\theta_3(e)=4$; the meaning here is that e is contained in at least 4 substream states for $S_3$ transmitted to the coordinator. It follows that $\phi(S_1)=\phi(S_2)=1$ and $\phi(S_3)=1/4$. Also, the formula $\Psi_j^+$ for E at site j is given as:

$$(\neg \hat{p}_1 \vee \neg \hat{p}_2 \vee \hat{p}_3) \wedge (p_1 \wedge p_2 \wedge \neg p_3) \wedge (p_1 \wedge \hat{p}_2 \wedge \hat{p}_3)$$

Thus, for any model M that satisfies $\Psi_j^+$, it must be the case that $\{\hat{p}_3, \neg p_3\}$. As a result, $S_3 \in P$ and since the charge $\phi(S_3)$ for $S_3$ is the smallest, it is chosen as the culprit for all models. Consequently, since $S_3$ has a local state change at site j, $\phi_j(M)=\phi(S_3)=1/4$ for all models M that satisfy $\Psi_j^+$, and thus, the charge $\phi_j^+(e)=1/4$. Furthermore, since $\Psi_j^-$ is unsatisfiable, charge $\phi_j^-(e)=0$.

If the stream $S_3$ does not have a local state change at site j (i.e., e is neither in $\hat{S}_{3,j}$ nor in $S_{3,j}$), then $e \in F_3$, $\Psi_j^+$ will remain the same as before and $S_3$ will still be chosen as the culprit stream for all models M that satisfy $\Psi_j^+$. However, since $S_3$ does not have a local state change at site j, $\phi_j(M)$ will be 0 for the models, and thus charge $\phi_j^+(e)=0$.

Computational Complexity.

In order to determine the complexity of the model-based approach, the following decision problem for $\phi_j^+(e)$ is considered.

PROBLEM (MAXIMUM CHARGE MODEL): Given expression E, site j, element e, and constant k, does there exist a model M that satisfies $\Psi_j^+$ and for which $\phi_j(M) \geq k$?

The following theorem can be proved using a reduction from 3-SAT: The MAXIMUM CHARGE MODEL problem is NP-complete. Therefore, it follows that since $\phi_j^+(e)$ is the maximum charge for models M that satisfy $\Psi_j^+$, computing $\phi_j^+(e)$ is intractable.

Heuristic for Charge Computation.

The model-based charging procedure enumerates all models M in the worst case, and thus, has a worst-case time complexity of $O(2^{2n})$. While this may be reasonable for small values of n (e.g., 3 or 4 streams), the model enumeration-based approach will clearly not scale when set expressions involve a moderately large number of streams, a scenario likely in practice. (e.g. in the Akamai case). In this section, the methodologies present a heuristic solution for computing the charges $\phi_j^+(e)$ and $\phi_j^-(e)$ for an element e at site j. The heuristic procedure has a time complexity that is polynomial in the number of streams n, and computes identical charge values as the model-based approach as long as every stream appears at most once in the expression E. However, the heuristic may overcharge for element e in certain cases when there are duplicate occurrences of streams in expression E.

Overview.

The model-based charging procedure computes $\phi_j^+(e)$ as the maximum stream charge $\phi(S_i)$ such that (1) $S_i$ has a local state change at site j, and (2) $S_i$ is the culprit stream for some model M that satisfies $\Psi_j^+$ (Recall that the culprit stream $S_i$ for model M is the stream with the smallest charge, index pair $<\phi(S_i),i>$ from among streams with a global state change in M.) Thus, for a stream $S_i$, if the methodologies can develop a test for quickly determining if $S_i$ is the culprit stream for some model that satisfies $\Psi_j^+$, then the methodologies can speed up the computation of charge $\phi_j^+(e)$. This is a key idea underlying the heuristic.

Let T denote the expression tree for E with leaves and internal nodes corresponding to streams and set operators in E, respectively. For each node V of T, let E(V) be the subexpression for the subtree rooted at node V, and $\hat{F}_{E(V)}$ and $F_{E(V)}$ be the formulae for E(V) as defined in Section 4.1.1. For example, in the expression tree for $E=S_1 \cap (S_2-S_3)$, the subexpression for the subtree rooted at V="−" is $E(V)=S_2-S_3$.

and $F_{E(V)}=p_2 \wedge \neg p_3$. Now, in order to quickly test if a stream $S_i$ is the culprit stream for some model satisfying $\Psi_j^+$, the heuristic keeps track of culprit streams (for models) at each node of the expression tree using the notion of charge triples. Formally, suppose that M is a model that satisfies the local constraints $(G_j \wedge \hat{G}_j \wedge H)$ at site j. At node V in T, the methodologies define the charge triple for model M, denoted by t(M,V), as the triple (a,b,x) with the following values:

If M satisfies $\hat{F}_{E(V)}$, then bit a=1; otherwise, a=0.

Similarly, if M satisfies $F_{E(V)}$, then bit b=1; otherwise b=0.

If none of the streams in V's subtree have a global state change in model M, then x=∞. (The charge, index pair $<\phi(S_\infty),\infty>$ is considered to be greater than $<\phi(S_i),i>$ for all streams $S_i$) Otherwise, x is the index of the culprit stream for M in V's subtree; that is, x=i, where $S_i$ is the stream with the smallest charge, index pair $<\phi(S_i),i>$ from among streams (in V's subtree) with a global state change in M.

For example, consider a model M that satisfies $\neg \hat{F}_{E(V)} \wedge F_{E,V}$ (in addition to local constraints). Then, if the culprit stream $S_i$ for M in V's subtree is defined, the charge triple t(M,V) for M at node V is (0,1,i); otherwise, t(M,V)=(0,1∞). The charging heuristic computes, in a bottom-up fashion, a set C of charge triples for each node V of T. Furthermore, it ensures that for every model M that satisfies $(G_j \wedge \hat{G}_j \wedge H)$, the computed set C for node V contains the triple t(M,V). Here, it is important to note that the size of C (in the worst case) is linear in the number of streams n—this is because there are at most O(n) distinct charge triples t(M,V) (one for each combination of a,b and x).

Now, consider the charge triple set C for the root V of T. Clearly, since E(V)=E, if a model M satisfies $\Psi_j^+=(\neg \hat{F}_E \wedge F_E) \wedge (\hat{G}_j \wedge G_j \wedge H)$ and has culprit stream $S_i$, then triple t(M,V)=(0,1,i) must be in C. Thus, the methodologies can quickly determine if a stream $S_i$ is the culprit stream for some model satisfying $\Psi_j^+$ by checking if C contains the triple (0,1,i). Hence, by selecting $\phi_j^+(e)$ to be the maximum stream charge $\phi(S_i)$ such that (1) $S_i$ has a local state change at site j, and (2) triple (0,1,i)∈C, the methodologies can ensure that Model M satisfies $\Psi_j^+\}$ and thus, due to Lemma 1, the charging heuristic is correct.

The following example illustrates the execution of a bottom up charge triple computation (a more detailed explanation is provided below with respect to FIG. 7 and its associated text).

Example 3

Figure 5:
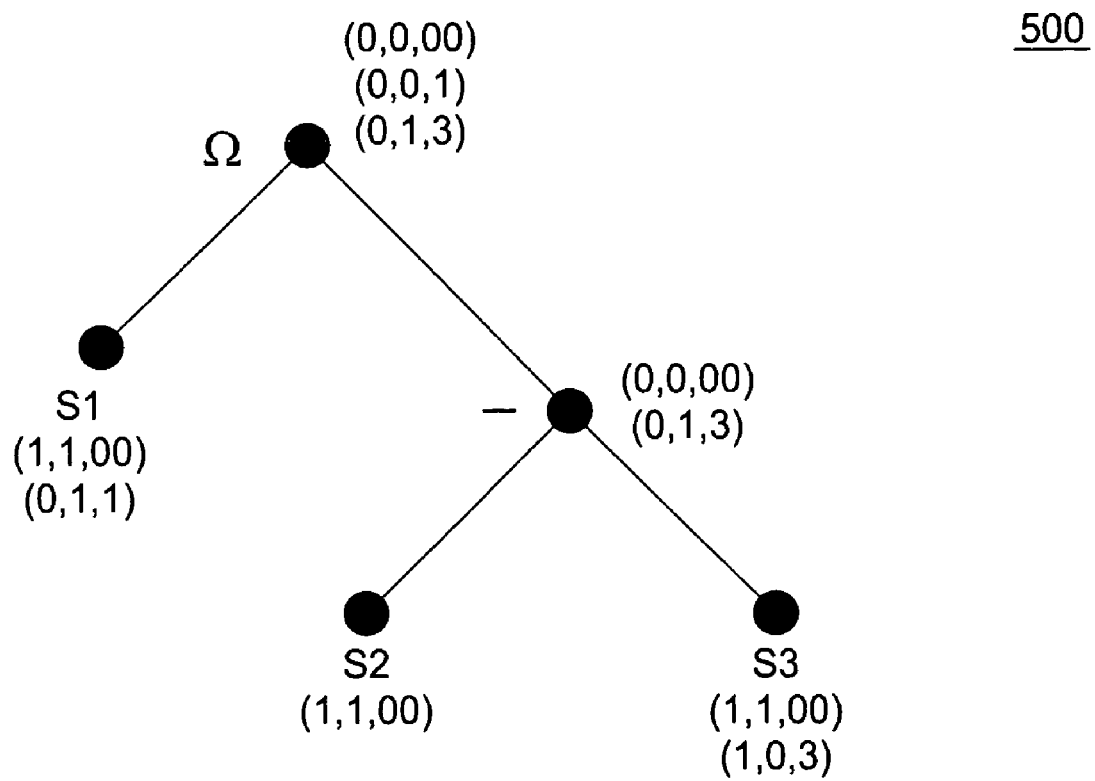
FIG. 5 graphically illustrates charge triple sets computed for the nodes of the expression tree for E by a charging heuristic.

Consider the distributed scenario described in Example 2 involving streams $S_1$, $S_2$ and $S_3$, and expression $E=S_1 \cap (S_2-S_3)$. Suppose that element e is in all substream states except for $\hat{S}_{1,j}$ and $S_{3,j}$, and also $e \in F_3$ and $\theta_3(e)=4$. Thus, $\phi(S_1)=\phi(S_2)=1$ and $\phi(S_3)=1/4$. FIG. 5 graphically illustrates the charge triple sets computed for the nodes of the expression tree for E by the charging heuristic.

The charge triple set for each leaf $S_i$ is first initialized to contain t(M,$S_i$) for models M that satisfy local constraints. For example, since e is in $S_{1,j}$ but not in $\hat{S}_{1,j}$, it follows that $p_1 \in G_j$ and thus for models M that satisfy $(G_j \wedge \hat{G}_j \wedge H)$, $p_1 \in M$ but $\hat{p}_1$ may or may not be in M; so the charge triple set for $S_1$ contains the triples (1,1,∞) (for models that contain $\hat{p}_1$) and (0,1,1) (for models that do not contain $\hat{p}_1$).

Next, the charge triple (a,b,x) for each internal node V is computed by combining pairs of triples $(a_1,b_1,x_1)$ and $(a_2,b_2,x_2)$ from V's two children. Suppose that op is the Boolean operation corresponding to the set operation for V, the Boolean operations for ∪,∩ and − are ∨,∧ and ∧¬, respectively. Then $a=a_1$ op $a_2$, $b=b_1$ op $b_2$, and x is set to one of $x_1$ or $x_2$, whichever has the smaller charge, index pair $<\phi(S_{x,i}),x_i>$ For example, the charge triples for node "−" of T are generated by combining triples for nodes $S_2$ and $S_3$. Triples $(1,1,\infty)$ and $(1,1,\infty)$ when combined result in the triple $(0,0,\infty)$ (since $1 \wedge \neg 1=0$). Similarly, combining triples $(1,1,\infty)$ and $(1,0,3)$ results in the triple $(1,0,3)$ (since $1 \wedge \neg 0=1$, and $<\phi(S_3),3>$ is less than $<\phi(S_\infty),\infty>$). Finally, the sets for $S_i$ and "−" are combined to obtain the charge triple set C for the root node "∩", which is then used by the charging heuristic to compute the charges $\phi_j^+(e)$ and $\phi_j^-(e)$. Since C contains the triple $(0,1,3)$ and $S_3$ has a local state change at site j, charge $\phi_j^+(e)=\phi(S_3)=1/4$. Further, since C does not contain a triple of the form $(1,0,x), \phi_j^-(e)=0$.

Correctness Argument. The following lemma establishes the correctness of] the charging heuristic.

Lemma 2: Consider a model M that satisfies local constraints $(G_j \wedge \hat{G}_j \wedge H)$ at site j. Then, for an arbitrary node V in T, charge triple $t(M,V)$ is in the set of charge triples for V computed by the heuristic.

Computational Complexity. The maximum size of a charge triple set for a node is O(n), and thus, the worst-case time complexity of the charging heuristic can be shown to be $O(n^2s)$, where s is the size of set expression E. By using the following pruning optimization, the maximum size of a charge triple set for a node can be reduced to O(1), and thus the time complexity of our charging heuristic can be reduced to O(s):

At each node having charge triples of the form (a,b,x), at most two distinct charge triples are maintained for each of the four possible combinations of values a and b can take:

(1) The charge triple with the largest charge index pair $\phi(S_x),x$; and
(2) The charge triple with the largest charge index pair $\phi(S_y),y$ amongst all charge triples where the index y corresponds to a culprit stream having a local state change. (Note that the charge triples corresponding to (1) and (2) could be identical.)

The following lemma implies that when E contains no duplicate streams, the heuristic returns the same charge values as the model based approach.

Lemma 3: Let E be a set expression in which each stream appears at most once. For an arbitrary node V in T, charge triplet is in the set of charge triples for V computed by the heuristic if and only if $t=t(M,V)$ for some model M satisfying $(G_j \wedge \hat{G}_j \wedge H)$ at site j.

The following discussion is directed to more detailed descriptions of alternate embodiments of the invention.

Charging Schemes

Correctness Invariants

The charging schemes presented herein (such as the procedure COMPUTECHARGE provided in FIG. 3, the model-based charging scheme and the tree-based charging heuristic) satisfy the following two invariants:

For each $e \in E-\hat{E}, \Sigma_j \phi_j^+(e) \geq 1$ (equation 6)

For each $e \in \hat{E}-E, \Sigma_j \phi_j^-(e) \geq 1$ (equation 7)

These invariants are necessary for correctness of any distributed charging scheme. In this section, it will be shown that maintaining these invariants are also sufficient to ensure correctness of the charging schemes. In particular, Equation (7) implies that $|\hat{E}| \leq |E|+\epsilon$ and (analogously) Equation (6) implies that $|E|-\epsilon \leq |\hat{E}|$. Suppose Equation (7) holds. Then, we have $$|\hat{E}| \leq |E| + |\hat{E} - E|$$

$$\leq |E| + \sum_{e \in \hat{E}-E} \sum_j \phi_j^-(e)$$

/*Since Equation(7)holds*/

$$\leq |E| + \sum_j \sum_{e \in \hat{E}-E} \phi_j^-(e)$$

$$\leq |E| + \sum_j \Phi_j^-$$

$$\leq |E| + \sum_j \varepsilon_j$$

/*Since $\Phi_j^- \varepsilon_j$ */

$$\leq |E| + \varepsilon$$

In an analogous manner, Equation (6) implies that $|E|-\epsilon \leq |\hat{E}|$.

FIG. 6-7 depicts a pseudo code representations of remote site charge computation routines according to various embodiments of the invention.

Pseudo Code for Model-Based Charging Algorithm

FIG. 6 depicts a model-based algorithm for computing the charges $\phi_j^+(e)$ and $\phi_j^-(e)$ for element e at site j. Procedure COMPUTECHARGE2 invokes CHARGE to determine the charges $\phi_j(M)$ for models M that satisfy $\Psi_j$, and selects $\phi_j(e)$ to be the maximum of the model charges. For a model M, CHARGE selects a single culprit stream $S_i$ from the set P of streams as described in Step 2. Essentially, streams $S_i \in P$ are lexicographically ordered based on charge, index pairs $<\phi(S_i)>$, and the smallest stream in the lexicographic ordering is chosen as the culprit. In other words, the culprit stream is the stream with the minimum charge $\phi(S_i)$, with ties being broken in favor of the stream with the smallest index. Clearly, since the charge $\phi(S_i)$ for stream $S_i$ is the same across all the sites, our simple culprit selection scheme satisfies the uniform culprit selection property. Thus, due to Lemma 1, our charging procedure COMPUTECHARGE2 is correct. Also, observe that since procedure CHARGE selects the stream with the smallest charge as the culprit for model M, it minimizes the maximum charge incurred for M across the sites.

Pseudo Code of Procedure for Tree-Based Charging Heuristic

TABLE 1

Charge Triple Initialization Table

| Stream State | Charge Triples |
|---|---|
| $(e \in \hat{S}_{i,j} \vee e \in F_i) \wedge e \in S_{i,j}$ | $(1, 1, \infty)$ |
| $e \in \hat{S}_{i,j} \wedge e \in F_i \wedge e \notin S_{i,j}$ | $(1, 1, \infty) (1, 0, i)$ |
| $e \in \hat{S}_{i,j} \wedge e \notin F_i \wedge e \notin S_{i,j}$ | $(1, 1, \infty) (1, 0, i)$ |
| $e \notin \hat{S}_{i,j} \wedge e \in F_i \wedge e \notin S_{i,j}$ | $(1, 1, \infty) (1, 0, i)$ |
| $e \notin \hat{S}_{i,j} \wedge e \notin F_i \wedge e \in S_{i,j}$ | $(1, 1, \infty) (0, 1, i)$ |
| $e \notin \hat{S}_{i,j} \wedge e \notin F_i \wedge e \notin S_{i,j}$ | $(1, 1, \infty) (1, 0, i)$ |
| | $(0, 1, i) (0, 0, \infty)$ |

FIG. 7 depicts an expression tree-based charging heuristic. Specifically, the procedure COMPUTERCHARGE3 relies on procedure CHARGETRIPLES to recursively compute charge triple sets C for each node V of T from the charge triple sets for the node's two children. If V is a leaf corresponding to stream $S_i$, then C is initialized as shown in Table 1 based on the current local state $S_{i,j}$ of the stream at site j, the stream state $\hat{S}_{i,j}$ communicated by site j to the coordinator, and the values of $F_i, \theta_i$ for stream $S_i$. Essentially, since $F_{E(V)} = p_i$, $\hat{F}_{E(V)} = \hat{p}_i$, models satisfying $(G_j \wedge \hat{G}_j \wedge H)$ can be grouped under one of four categories depending on whether or not $\hat{p}_i \in M$, $p_i \in M$. The models M in each category map to the same charge triple (a,b,x), where a=1 iff $\hat{p}_i \in M$ and b=1 iff $p_i \in M$. Furthermore, if a=b, then since $S_i$ does not have a global state change in M, x=∞. On the other hand, if a≠b, then x=i since $S_i$ is the (only) culprit stream for M. For example, suppose that $e \in \hat{S}_{i,j}$, $e \notin S_{i,j}$ and $e \in F_i$. Then, $\hat{p}_i \in \hat{G}_j$, $\hat{p}_i \in H$, and for the models M that satisfy $(G_j \wedge \hat{G}_j \wedge H)$, we have that $\hat{p}_i \in M$, while $p_i$ may or may not belong to M. Thus, for models M that contain $p_i$, the charge triple is (1,1,∞), and for those that do not, the charge triple is (1,0,i).

Next, consider the case when V is an internal node for one of the set operators in $\{\cup, \cap, -\}$. Let $C_1$ and $C_2$ be the charge triple sets for V's two children $V_1$ and $V_2$. Then, for a model M satisfying $(G_j \wedge \hat{G}_j \wedge H)$, the charge triple t(M,V) in the charge triple set C at node V can be obtained by combining the charge triples $t(M,V_1) \in C_1$ and $t(M,V_2) \in C_2$ for M at nodes $V_1$ and $V_2$, respectively. To see this, suppose that $t(M,V_1) = (a_1, b_1, x_1)$ and $t(M,V_2) = (a_2, b_2, x_2)$. Also, let op=bool_op(V), where bool_op($\cup$)=$\vee$, bool_op($\cap$)=$\wedge$ and bool_op(-)=$\neg \wedge$ are Boolean operators corresponding to the set operators.

From the construction of $F_{E(V)}$, it is known that $F_{E(V)} = F_{E(V_1)}$ op $F_{E(V_2)}$ and thus M satisfies $F_{E(V)}$ if (M satisfies $F_{E(V_1)}$ op M satisfies $F_{E(V_2)}$). As a result, if t(M,V)=(a,b,x), then a=$a_1$ op $a_2$ and b=$b_1$ op $b_2$. Further, the culprit stream for M in V's subtree is one of $S_{x_1}$ (under node $V_1$) or $S_{x_2}$ (under node $V_2$) depending on which stream has a smaller charge, index pair. Note that if an index, say $x_1$ is equal to ∞, implying that there is no culprit under node $V_1$, then the culprit under V is the same as the culprit for $V_2$ (assuming it is defined).

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. In a system adapted to receive update streams from a plurality of update stream sites, a method comprising:
   establishing, for each of said update stream sites, a respective site charge budget, said site charge budget being determined by a coordinator site; and
   communicating, by the coordinator site, which comprises at least a processor, said site charge budgets toward said update stream sites;
   each site charge budget being adapted to control an initiation of update stream transmission by restricting transmission of said update stream until a sum of element charges at the respective update stream site exceeds the site charge budget, said element charges being attributed to stream element updates;
   wherein said update stream elements comprise insertion elements and deletion elements, each of said insertion elements and deletion elements being associated with element charges wherein said insertion element charges and said deletion elements charges are determined in a manner satisfying the following invariants:

For each $e \in E - \hat{E}$, $\Sigma_j \phi_j^+(e) \geq 1$; and

For each $e \in \hat{E} - E$, $\Sigma_j \phi_j^-(e) \geq 1$.

where e is the specific data element whose frequency changes;
E is a set expression;
$\hat{E}$ is the result of evaluating the expression E;
$\phi_j(e)$ is a charge with each element e at every remote site j.

2. The method of claim 1, wherein a total error budget comprises the sum of the site charge budgets allocated to each of said update sites, said total error budget being allocated among said update sites in proportion to stream update rates at the sites.

3. The method of claim 1, wherein a total error budget comprises the sum of the site charge budgets allocated to each of said update sites, said total error budget being allocated among said update sites in a manner satisfying the following invariant: $\Sigma_j \epsilon_j = \epsilon$ and for all j, $\epsilon_j \geq 0$.

4. The method of claim 1, wherein the element charges are determined by at least one of set expression semantics and global information of element counts.

5. The method of claim 1, wherein insertion element charges and deletion element charges are determined according to a Boolean logic formula.

6. The method of claim 5, wherein the Boolean logic formula is described as follows:

$$\Psi_j^+ = (\neg \hat{F}_E \wedge F_E) \wedge (\hat{G}_j \wedge G_j \wedge H); \text{ and}$$

$$\Psi_j^- = (\hat{F}_E \wedge \neg F_E) \wedge (\hat{G}_j \wedge G_j \wedge H).$$

7. The method of claim 6, wherein the Boolean logic formula is used to determine element charges $\phi_j^+(e)$ and $\phi_j^-(e)$ as follows:

$$\phi_j^+(e) = \max\{\phi_j(M) : \text{Model } M \text{ satisfies } \Psi_j^+\}; \text{ and}$$

$$\phi_j^-(e) = \max\{\phi_j(M) : \text{Model } M \text{ satisfies } \Psi_j^-\};$$

wherein:

$$\phi_j(M) \text{ is given by } \phi_j(M) = \begin{cases} \phi(S_i) & \text{if culprit stream } S_i \text{ has a local state change at site } j; \\ 1 & \text{otherwise} \end{cases}$$

and $$\phi(S_i) \text{ is given by } \phi(S_i) = \begin{cases} 1/\theta_i(e) & \text{if } e \in F_i \\ 1 & \text{otherwise} \end{cases}.$$

8. The method of claim 1, wherein insertion element charges and deletion element charges are determined according to a tree based heuristic that propagates charges in a bottom up manner starting from leaf nodes of a set expression tree, wherein the a charge at a root node is used to determine the element update charge at a given site.

9. The method of claim 8, wherein:
   charge triples of the form (a,b,x) are propagated up the expression tree;
   leaf nodes are initialized according to the following table:

| Stream State | Charge Triples |
|---|---|
| $(e \in \hat{S}_{i,j} \vee e \in F_i) \wedge e \in S_{i,j}$ | (1, 1, ∞) |
| $e \in \hat{S}_{i,j} \wedge e \in F_i \wedge e \notin S_{i,j}$ | (1, 1, ∞) (1, 0, i) |
| $e \in \hat{S}_{i,j} \wedge e \notin F_i \wedge e \notin S_{i,j}$ | (1, 1, ∞) (1, 0, i) |
| $e \notin \hat{S}_{i,j} \wedge e \in F_i \wedge e \notin S_{i,j}$ | (1, 1, ∞) (1, 0, i) |
| $e \notin \hat{S}_{i,j} \wedge e \notin F_i \wedge e \in S_{i,j}$ | (1, 1, ∞) (0, 1, i) |
| $e \notin \hat{S}_{i,j} \wedge e \notin F_i \wedge e \notin S_{i,j}$ | (1, 1, ∞) (1, 0, i) |
| | (0, 1, i) (0, 0, ∞); | and the set C={(a,b,x)} of charge triples for each internal node V is computed as follows:
- combining pairs of triples $(a_1, b_1, x_1)$ and $(a_2, b_2, x_2)$ from V's two children nodes;
- calculating $a = a_1$ op $a_2, b = b_1$ op $b_2$, and setting x to one of $x_1$ or $x_2$, whichever has the smaller charge index pair $<\phi(S_{x,i}), x_i>$, where op is the Boolean operation corresponding to the set operation for V.

10. The method of claim 1, wherein:
each of said plurality of update stream sites maintains a summary of its respective update stream, said summary formed using a delete resistant scheme for maintaining distinct sample.

11. The method of claim 10, wherein said summary structure comprises a JD sketch synopsis data structure.

12. A distributed framework for providing a set expression estimation, comprising:
allocating, by a coordinator site, error budgets to each of a plurality of remote sites according to a first set of invariants, each of said remote sites providing a respective update stream to the coordinator site, said update streams including at least one of insert elements and delete elements; and
allocating update stream insert element and delete element charges according to a second set of invariants comprising:

For each $e \in E-\hat{E}, \Sigma_j \phi_j^+(e) \geq 1$; and

For each $e \in \hat{E}-E, \Sigma_j \phi_j^-(e) \geq 1$.

where e is the specific data element whose frequency changes;
E is a set expression;
$\hat{E}$ is the result of evaluating the expression E;
$\phi_j$ e) is a charge with each element e at every remote site j.
each of said remote sites accumulating element charges in response to the occurrence of respective update and delete elements;
each of said remote sites transmitting a respective update stream to said coordinator site when an accumulation of element charges exceeds a respective error budget.

13. The distributed framework of claim 12, wherein:
said coordinator site using update streams transmitted by said remote sites to estimate a set expression and its cardinality.

14. The distributed framework of claim 12, wherein said first set of invariants comprises:
$\Sigma_j \epsilon_j = \epsilon$ and for all j, $\epsilon_j \geq 0$.

15. The distributed framework of claim 12, further comprising:
adapting at least one of said site error budgets, said insert element charges and said delete element charges in response to coordinator site global information.

16. The distributed framework of claim 15, wherein said global information comprises lower bounds on a number of distinct sites at which a stream element is present.

17. The distributed framework of claim 16, wherein:
said site error budget $\theta_i(e)$ is reduced by a factor of 2 if $C_i(e)$ becomes less than $\theta_i(e)$, and doubled if $C_i(e)$ exceeds $4 \times \theta_i(e)$.

18. The distributed framework of claim 16, further comprising:
propagating global knowledge of element counts according to a scheme that satisfies the invariant $C_i(e) \geq \theta_i(e)$.

19. A system for processing set-expression cardinality queries, comprising:
a central site for establishing and communicating a site charge budget; and
a plurality of update stream sites, wherein:
each update stream site being allocated an error budget satisfying the following invariants:

For each $e \in E-\hat{E}, \Sigma_j \phi_j^+(e) \geq 1$; and

For each $e \in \hat{E}-E, \Sigma_j \phi_j^-(e) \geq 1$.

where e is the specific data element whose frequency changes;
E is a set expression:
$\hat{E}$ is the result of evaluating the expression E;
$\phi_j$ e) is a charge with each element e at every remote site j.
said error budgets adapted to determine when the update stream site communicates stream state information to the central site, said site error budget $\theta_i(e)$ is reduced by a factor of 2 if $C_i(e)$ becomes less than $\theta_i(e)$ and doubled if $C_i(e)$ exceeds $4 \times \theta_i(e)$.
each update stream site associates a charge with every stream element that is inserted or deleted since stream state was previously transmitted to the central site; and
each update stream site transmits current stream state information when the sum of its respective element charges exceeds its respective error budget.

* * * * *